United States Patent Office 3,096,371
Patented July 2, 1963

1

3,096,371
PHOSPHORISOCYANATIDIC DIFLUORIDE
George Andrew Olah and Stephen Joseph Kuhn, Sarnia, Ontario, Canada, assignors to The Dow Chemical Company, Midland, Mich., a corporation of Delaware
No Drawing. Filed Mar. 25, 1960, Ser. No. 17,450
Claims priority, application Canada Aug. 4, 1959
1 Claim. (Cl. 260—543)

This invention relates to a new chemical compound, phosphorisocyanatidic difluoride, and to a method for its preparation. Phosphorisocyanatidic difluoride is prepared, according to the present invention, by the reaction of phosphorisocyanatidic dichloride and antimony trifluoride, as shown in the equation:

The temperature for the reaction is maintained at between about 0° and about 70° C., preferably between about 30° and about 70° C.

Antimony trifluoride is added in excess of the stoichiometric requirement; a ratio of one mole of phosphorisocyanatidic dichloride to between 0.67 and 1.0 mole of antimony trifluoride is desirably employed.

After completion of the reaction, the phosphorisocyanatidic difluoride is separated from the reaction mixture, as by distillation. The pressure for this distillation may be varied, but atmospheric pressure is conveniently employed.

The practice of the present invention is illustrated by the following example.

*Example*

One hundred-sixty (160) grams (1.0 mole) of phosphorisocyanatidic dichloride were placed in a distillation apparatus and 150 grams (0.84 mole) of antimony trifluoride were added in small increments, pausing between each addition to allow the heat of reaction to dissipate before adding the next increment. After all of the antimony trifluoride had been added, the reaction vessel was heated to 60° C. to complete the reaction. The phosphorisocyanatidic difluoride was then distilled from the reaction mixture at atmospheric pressure and collected. There were obtained 120 grams (94 percent of the theoretical yield) boiling at 68–68.5° C. and having a refractive index, $n_D^{25}$, of 1.3381.

The compound of the present invention has shown outstanding utility as a growth inhibitor for grasses, as follows:

Seeds of *Setaria italica* (German millet) were placed

2 in a series of small jars, each of which contained 30 cc. of Sponge-Rok (a commercial variety of exploded aluminum silicate). 15 additional cc. of Sponge-Rok were then added to each jar. 25 cc. of an aqueous solution containing 100 parts per million by weight of phosphorisocyanatidic difluoride were added to each of several of the jars, while 25 cc. of an aqueous solution containing 100 p.p.m. by weight of phosphorisocyanatidic dichloride were added to each of several additional jars, and to each of a third group of jars was added 25 cc. of distilled water. The jars were capped for 72 hours at which time the caps were removed and the jars were left uncapped for an additional eleven days. Throughout the test period, the jars were kept in a controlled temperature room under conditions of alternating 12-hour periods of light and darkness, with the temperature adjusted to 27° C. during the periods of light and 17° C. during the periods of darkness, and the relative humidity was maintained at 85 percent.

At the end of the 14-day period, all specimens were inspected and the percent growth inhibition determined of those specimens employing the test chemicals compared to those employing only water. The growth of those specimens treated with the claimed compound, phosphorisocyanatidic difluoride, had been inhibited 90 percent compared to the specimens treated with water only. The growth of those specimens treated with the known compound, phosphorisocyanatidic dichloride, has not been noticeably inhibited.

In a similar manner, and under like conditions, seeds of *Digitaria* spp. were treated with solutions of the known compound, phosphorisocyanatidic dichloride, the claimed compound, phosphorisocyanatidic difluoride, and water. The phosphorisocyanatidic difluoride effected a growth inhibition of 70 percent compared to the control experiment, while the phosphorisocyanatidic dichloride effected no perceptible growth inhibition.

We claim:
Phosphorisocyanatidic difluoride.

References Cited in the file of this patent
UNITED STATES PATENTS 2,146,356    Schrader et al. _____ Feb. 7, 1939

FOREIGN PATENTS 591,383    Great Britain _____ Aug. 15, 1947

OTHER REFERENCES

Migrdichian: Organic Synthesis, vol. 1, pp. 519–520 (1957).